（12) United States Patent
Jerman et al.

(10) Patent No.: US 6,473,553 B1
(45) Date of Patent: Oct. 29, 2002

(54) APPARATUS FOR HOLDING AND ENGAGING MICRO-MACHINED OBJECTS AND METHOD FOR MAKING SAME

(75) Inventors: John H. Jerman, Palo Alto, CA (US); John D. Grade, Mountain View, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/505,341

(22) Filed: Feb. 16, 2000

Related U.S. Application Data

(63) Continuation-in-part of application No. 09/107,221, filed on Jun. 30, 1998, now Pat. No. 6,049,650.
(60) Provisional application No. 60/082,071, filed on Apr. 17, 1998, and provisional application No. 60/120,427, filed on Feb. 16, 1999.

(51) Int. Cl.7 .............................. G02B 6/00; H01L 21/70
(52) U.S. Cl. ...................... 385/137; 385/134; 385/136; 385/147; 385/14; 385/52; 437/51
(58) Field of Search .............................. 385/134, 136, 385/137, 147, 14, 52, 11, 51; 437/51, 54, 250, 131, 132

(56) References Cited

U.S. PATENT DOCUMENTS

| | | | |
|---|---|---|---|
| 4,270,838 A | 6/1981 | Furusawa et al. | 350/81 |
| 4,772,087 A * | 9/1988 | Ito | 385/137 X |
| 4,945,400 A | 7/1990 | Blonder et al. | 357/74 |
| 4,998,796 A | 3/1991 | Bonanni et al. | 350/96.21 |
| 5,123,073 A | 6/1992 | Pimpinella | 385/59 |
| 5,173,959 A * | 12/1992 | Cambriello | 385/89 |
| 5,323,481 A * | 6/1994 | Tokumaru et al. | 385/136 |
| 5,363,190 A | 11/1994 | Inaba et al. | 356/337 |
| 5,377,289 A | 12/1994 | Johnson et al. | 385/65 |
| 5,404,417 A | 4/1995 | Johnson et al. | 385/137 |
| 5,528,724 A | 6/1996 | Chang et al. | 385/137 |
| 5,550,942 A | 8/1996 | Sheem | 385/53 |
| 5,579,424 A | 11/1996 | Schneider | 385/49 |
| 5,600,741 A | 2/1997 | Hauer et al. | 385/35 |
| 5,644,672 A * | 7/1997 | Tanaka | 385/137 |
| 5,646,928 A | 7/1997 | Wu et al. | 369/112 |
| 5,687,267 A | 11/1997 | Uchida | 385/89 |
| 5,692,089 A | 11/1997 | Sellers | 385/137 |

(List continued on next page.)

OTHER PUBLICATIONS

Johnson, "Precise alignment of optical fibers using a microfabricated silicon device" (DuPont, Applied Engineering, Wilmington, DE, Int. Supp. Opt. Inst., Jul. 93, 7 pages).

Keller et al., "Hexsil tweezers for teleoperated micro–assembly", (Univ. Calif. Berkeley, 1997, pp. 72–77).

(List continued on next page.)

Primary Examiner—Brian Healy
(74) Attorney, Agent, or Firm—Flehr Hohbach Test Albritton & Herbert LLP

(57) ABSTRACT

An apparatus is provided for holding micron-sized objects, such as optical components, along with a method for making such an apparatus. The apparatus includes a mounting block having openings, such as cavities and recesses, for holding the micron-sized objects therein. The mounting block further includes one or more resilient members having a base mounted on the mounting block. The resilient members further include an engaging surface configured to engage a micro-machined object within a cavity or recess of the mounting block. When the object is engaged, the resilient member applies pressure to the object to secure it against a surface of the mounting block or against another resilient member. The object is held within the opening of the mounting block and can be moved within the opening to allow proper placement and subsequent adjustment of the object.

26 Claims, 15 Drawing Sheets

U.S. PATENT DOCUMENTS

| | | | | |
|---|---|---|---|---|
| 5,709,773 | A | | 1/1998 | Field et al. .............. 156/647.1 |
| 5,761,360 | A | * | 6/1998 | Grois et al. .................... 385/81 |
| 5,812,720 | A | | 9/1998 | Dannoux .................... 385/115 |
| 5,833,202 | A | | 11/1998 | Wolfgang ................... 248/466 |
| 5,852,298 | A | | 12/1998 | Hatakeyama et al. .... 250/492.2 |
| 6,002,827 | A | | 12/1999 | Ekwall ....................... 385/135 |
| 6,049,650 | A | * | 4/2000 | Jerman et al. .............. 385/137 |
| 6,134,371 | A | * | 10/2000 | Yoshida et al. ............. 385/137 |
| 6,200,040 | B1 | * | 3/2001 | Edwards et al. .............. 385/78 |

OTHER PUBLICATIONS

Guyenot et al., "Mounting, cementing and handling of microoptical elements" (SPIE, vol. 2783, pp. 105–116).

Lin et al., "Micromachined integrated optics for free–space interconnections" (IEEE, 1985, pp. 77–82).

Mohr et al., "Microoptical devices based on free space optics with LIGA microoptical benches examples and perspectives" (SPIE vol. 2783, pp. 48–54).

Yasseen et al., "A rotary electrostatic micromotor I × 8 optical switch" (1998 IEEE pp. 117–120).

* cited by examiner

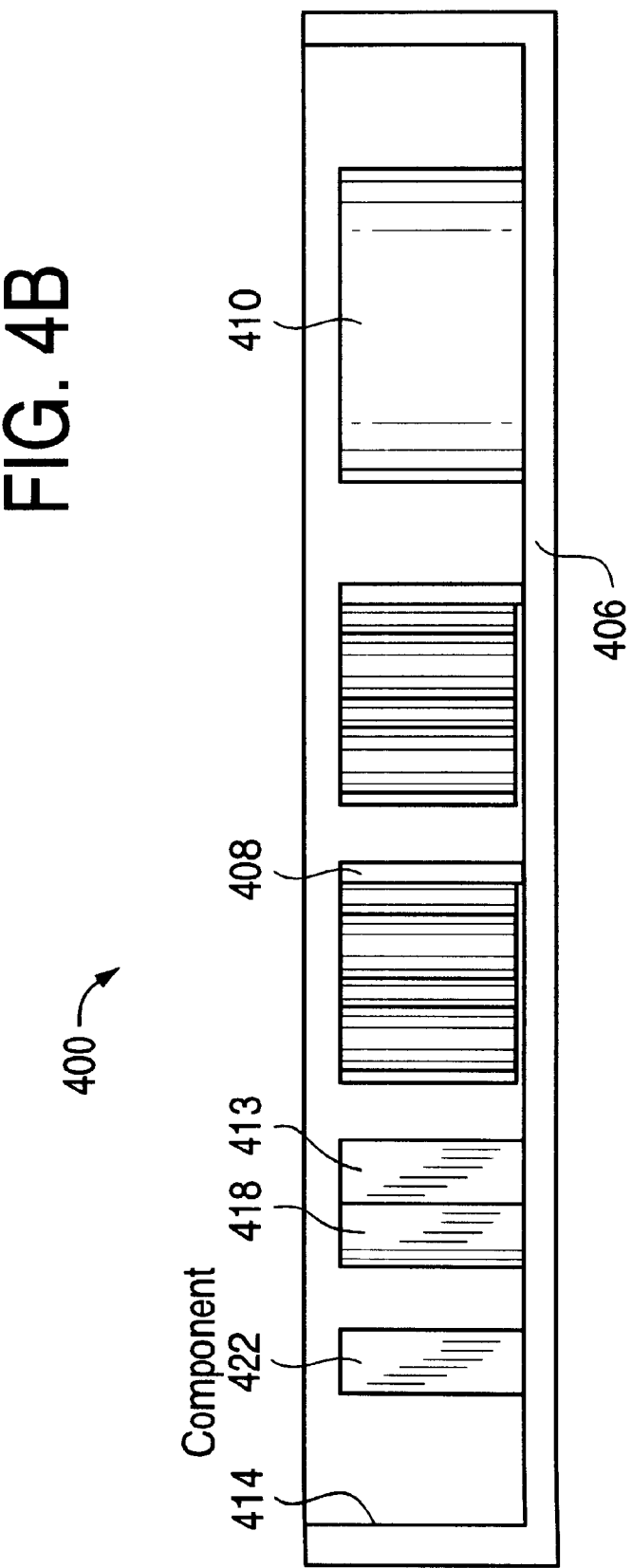

Step 1:
Apply patterned photo
resist to wafer side 1

Step 2:
Etch side 1
using drie

Step 3:
Apply heat release
tape to side 1 after etching

Step 4.4:
Apply patterned
photoresist to wafer side 2

Step 4.5:
Etch side 2

Step 4.6:
Heat in receiver to separate tools from heat release tape

Step 7:
Collect strips of tools for separation or use

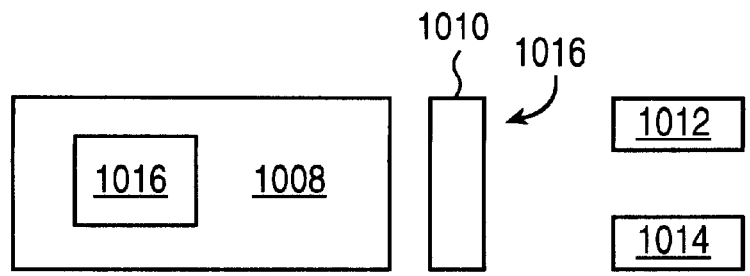
Top Protected Regions
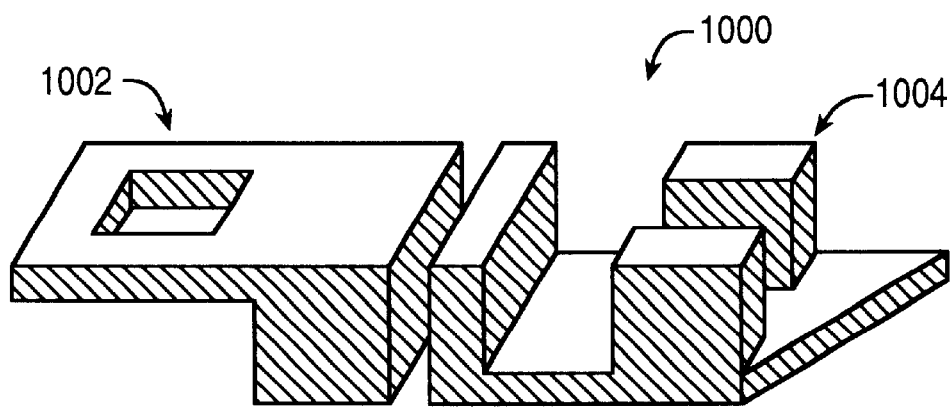
Finished Part
FIG. 10
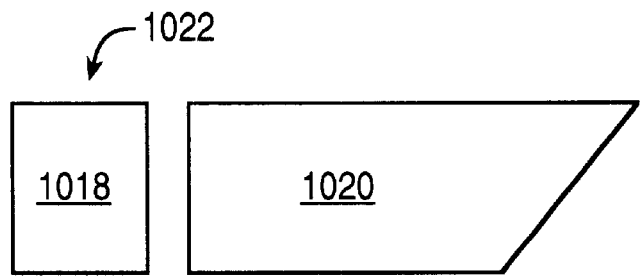
Bottom Protected Regions

APPARATUS FOR HOLDING AND ENGAGING MICRO-MACHINED OBJECTS AND METHOD FOR MAKING SAME

RELATED APPLICATIONS

This application is a Continuation In Part of U.S. patent application Ser. No. 09/107,221, entitled STRUCTURE FOR MICRO-MACHINE OPTICAL TOOLING AND METHOD FOR MAKING AND USING, filed Jun. 30, 1998, now U.S. Pat. No. 6,049,650. This application also claims priority to U.S. Provisional Patent Application No. 60/120,427, entitled IMPROVED OPTICAL PROCESSING HEAD, filed Feb. 16, 1999 and to provisional application No. 60/082,071 filed Apr. 17, 1998.

BACKGROUND

The invention relates in general to handling micromachined objects and, more particularly, to a device for holding and engaging micro-machined objects.

The technology evolving around micron sized machined objects, often referred to as micro-machined objects, has a wide variety of applications. Scientists and engineers are continually investigating and discovering new applications for micro-machined objects and components. Optical circuits, micron sized motors and related electrical circuits are but a few applications for this technology.

Optical circuits, for example, typically involve a variety of small components configured together to direct and transmit light signals. These components have considerably low tolerances for transmitting and manipulating light signals. It is therefore imperative that the components be precisely placed and aligned within the optics circuit.

Recently, optics circuits have been applied to the optical head of a magneto-optical (MO) drive. Placing these optical circuits directly on the reader head has proven to be advantageous to processing and transmitting light signals within the optical drive system accurately and efficiently. This application has employed the science of micro-machined optical components. To fit on a reader head, the optical circuits require components as small as 100 to 500 microns. These components need to be placed and precisely aligned on an optical reader head so that light signals can travel through the circuit to be processed properly.

The placing of these objects onto the reader head is a very labor intensive, delicate and intolerant process. Presently, the components are placed and fitted on the reader head by hand. Mechanical motion translators and micromanipulators allow a person to move and place objects within an optics circuit by converting their hand movements to much smaller movements to allow micron and sub-micron positioning. Often, placement of these small components require repeated attempts to affix them into the head holding the entire circuit. And, all of the awkwardness of assembling the circuits costs a great deal of money and time and is subject to errors in misalignment or misplacement. It would be useful to be able to more easily place and align these components.

One common method for placing and adjusting optical components on a substrate is to etch a V-shaped groove into the substrate and align components within the groove to form a circuit. In operation, components are placed in the groove and glued in place once they are aligned. Using conventional methodology, tiny fiber optic cables, for example, are placed within the groove and aligned with respect to the overall optical circuit. A strap is then placed across the fiber and immediately glued in place using a quick curing adhesive, permanently affixing the fiber in place. One major problem with this method is that the fiber can not be further adjusted after it is glued in place as to focus a light beam carried by the fiber. It would be useful to be able to place these tiny fibers and other components within a circuit and to subsequently adjust them. A person assembling the circuit can then align and tune the circuit more accurately.

Another device for holding micro-machined components is known in the art as "micro optical benches". These devices are simply substrates having patterns of grooves and slots configured to hold conventional machined microoptical components. These structures, however, do not address the need for precision placement and adjustment of micro-machined components. They merely provide a medium for holding the components. They include no meaningful structures to aid in precision placement and adjustment of the components.

One other proposed solution is to etch components having optical characteristics from the substrate itself. This has been attempted in order to substitute micro-machined components for etched figures having similar optical characteristics. The problem with this method is that micron sized optical circuits require a great deal of precision that presently requires micro-machined components made from delicate materials. It is difficult to find a material that has good optical characteristics and can also be easily etched. The results so far have produced circuits having components with simply inadequate optical characteristics.

Yet another solution proposes to form optic components from plastics. These components supposedly allow the components to be easily snapped into voids within a substrate. The problem with this method is that these components, like the etched components discussed above, have inadequate optical characteristics. Furthermore, once these components are snap-fitted into the substrate, they can not be easily removed in tact for adjustment. They are also limited in size to 500 microns, much too limiting for micron sized optical components.

Therefore, there exists a need for a device for holding and engaging micron-sized objects and allowing for precision placement and alignment and that further allows subsequent adjustment once a component is placed. As will be seen, the invention solves these problems and overcomes these shortcomings of the prior art in a simple and elegant manner.

SUMMARY OF THE INVENTION

In one respect, the invention provides an apparatus for holding micron-sized objects. The apparatus includes a mounting block having openings, such as cavities and recesses, for holding the micron-sized objects therein. The mounting block further includes one or more resilient members having a base mounted on the mounting block. The resilient members further include an engaging surface configured to engage a micro-machined object within a cavity or recess of the mounting block. When the object is engaged, the resilient member applies pressure to the object to secure it against a surface of the mounting block or against another resilient member. The object is held within the opening of the mounting block and can be moved within the opening to allow proper placement and subsequent adjustment of the object.

The invention further provide a method of making the apparatus is also provided that includes etching the mounting block to create cavities and recesses. The method further includes simultaneously creating resilient members along with and within the openings within the mounting block. The result is a mounting block having at lease one resilient member and configured to engage and hold micro-machined objects.

BRIEF DESCRIPTION OF THE DRAWINGS

FIG. 10 is a perspective view of a figure created from silicon using an etching process along with associated protective masks in order to illustrate the etching process.

DETAILED DESCRIPTION OF PREFERRED EMBODIMENTS

The invention is directed to an apparatus for holding and engaging micron sized objects on a mounting block. The invention may include resilient members formed within cavities and recesses of a mounting block. The invention will be found useful for applications that require proper placement and adjustment of tiny components for optimal performance and efficient assembly and manufacture. The invention is particularly adapted to the holding and engaging of micro-machined optics components on and within an optics mounting block and will be described in that context. However, it will be appreciated by those skilled in the art, that this is illustrative of only one utility of the invention, and that the invention has greater applicability and utility in many other applications where the handling of very small objects are involved. Equivalent structures embodying the invention could be configured for such applications without diverting from the spirit and scope of the invention as defined in the appended claims.

For example, certain aspects of the invention could be applicable in other applications such as optical switches. Optical switches that utilize micron sized optical components could employ the invention to hold and engage components much like the configuration described below. Like magneto optical heads, optical switches require proper placement and adjustment of components for optimal performance and efficient assembly and manufacture. Many other applications that require the placement and retention of micron sized objects could also benefit from the invention as described below.

Figure 1A:
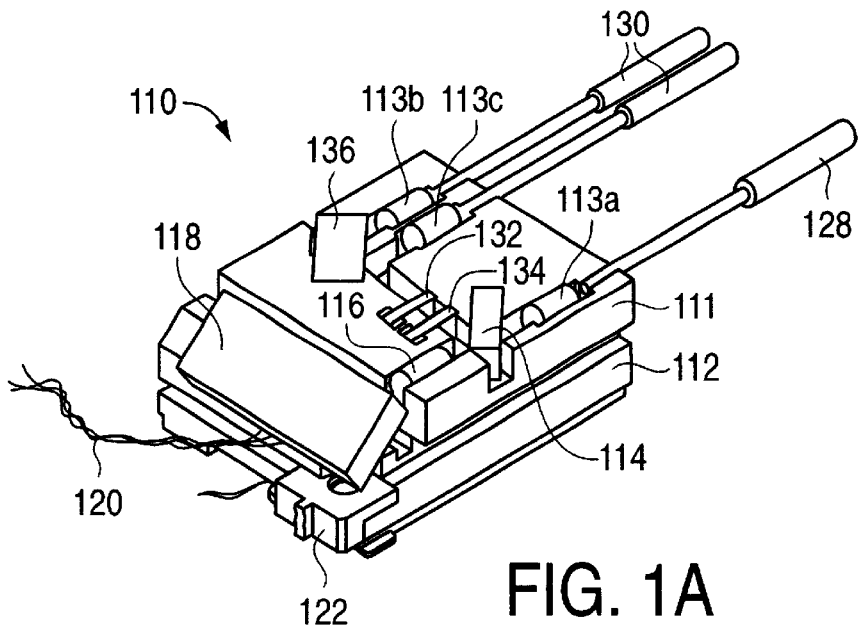
FIGS. 1A–1C are perspective, top and side cut-away views respectively of an optical head according to the invention.
Figure 1B:
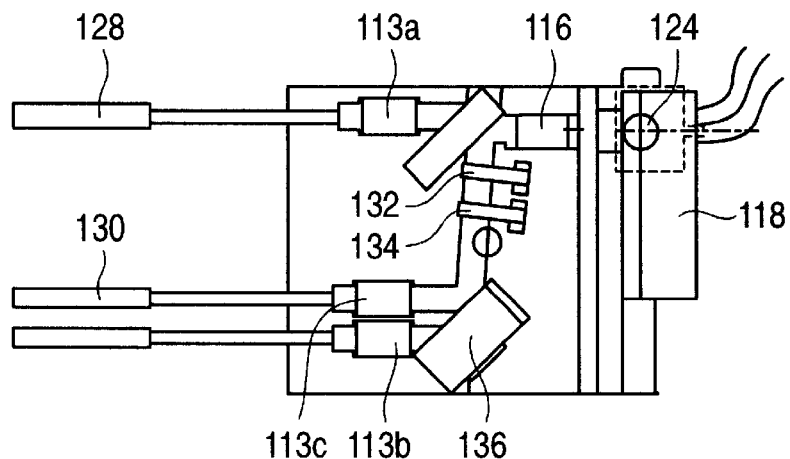
Figure 1C:
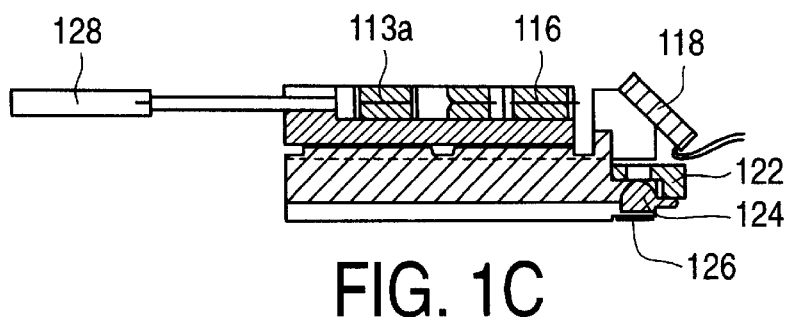

FIGS. 1A through 1C illustrate a magneto-optical (MO) head 110 in perspective, top, and side cross-sectional views, respectively. The MO head 110 includes a slider body 112 which would normally be mounted on a reader arm (not shown) so that the reader head can be positioned to read digital data from an optical disk within a reading device. The head includes an optical mounting block 111 that has recesses and cavities for holding optical components to form an optical circuit within the block.

The mounting block 111 may be made from a monocrystalline (single crystal) silicon using photo-lithographic techniques and deep reactive ion etching (DRIE). A silicon wafer, for example, which is commonly used in the manufacture of silicon-based electronic circuits, may have the structure carved therein to form the mounting block 111. This silicon wafer can be conventionally prepared by slicing the silicon from a boule and subsequently grinding, lapping and polishing the wafer. Typically, the wafer may have a 100 millimeter diameter and a 400 micron thickness. Other sizes and thicknesses are also possible using such a process.

For MO heads, it is important that the mounting block 111 be as small as possible so that the entire MO head is as small and lightweight as possible. An overweight MO head could cause problems when the reader arm reads information from the optical disk. As a result, the arm onto which the MO head is mounted is very delicate and sensitive to weight, since it is required to fly at a certain height very close to the surface of an optical disk. As will be described below, the components mounted onto and within the mounting block are very small, even micron-sized, and are very difficult to place, engage and align. The invention allows a convenient way to mount these components onto and within the mounting block 111 so that they can be easily placed and engaged. Furthermore, the invention allows the ability to accurately place, align and adjust components mounted on and within the mounting block. This provides the ability to adjust the components after they are mounted and tune the optical circuit so that it operates properly.

Unlike the prior art, the invention allows the components to be subsequently positioned and adjusted after they are mounted within the mounting block. This is possible because resilient members (discussed below) at least temporarily hold the components in place. This allows for removal, positioning and adjustment of the components after they are mounted within the block. After the components are adjusted properly in place and the optical circuit is tuned, the components can be glued in place using an epoxy or other material so that they components will not fall out of adjustment. In conventional methods, components were placed within the mounting block and immediately glued in place, not allowing subsequent positioning and adjustment. This resulted in less accurate optical circuits as well as cumbersome assembly. As will be seen, these shortcomings are overcome by the invention.

Still referring to FIG. 1, a MO head 110 may include collimating optics 113, a low wavelength dispersion leaky beam splitter (LBS) 114, and a coupling lens 116. The MO head 110 may further include a dynamic mirror 118, mirror control wires 120, a lens holder 122, a focusing lens 124, and a coil 126. The set of optical fibers may be connecting a control circuit (not shown) to the head ma include one polarization maintaining (PM) fiber 128 and two multi-mode (MM) fibers 130. These components make up an optical circuit to aid in sending and receiving light signals used to read information from an optical disk.

In operation, an outgoing laser beam (not shown) may be delivered to a MO head 110 via the PM fiber 128. Laser light emanating from the distal end of the PM fiber 128 may be focused by the collimating optics 113a into the LBS 114. Most or all of the laser light entering the LBS 114 from the collimating optics 113a may propagate through an opposing side of the LBS 114 and to the coupling lens 116, which may direct the laser light onto the dynamic mirror 118. Wires 120 may be used to adjust and control the mirror 128. Outgoing light reflecting from mirror 118 may pass through the coil 126 and may be focused by the lens 124 onto the surface of an MO disc (not shown) to read digital data.

The MO head 110 may additionally include a quarter-wave plate 132, a half-wave plate 134, and a polarizing beam splitter 136. An outgoing laser beam (not shown) may be reflected by the surface of an optical disc. The reflected incoming beam may pass through the lens 124 and may be directed by the dynamic mirror 118 and the coupling lens 116 to the LBS 114. The incoming light may be reflected by the LBS 114, such that most or all of the light from the incoming laser beam may be directed to the quarter-wave plate 132. An incoming laser beam may pass through the quarter-wave plate 132 and the half-wave plate 134 to the PBS 136. The PBS 136 may reflect a first polarization of light from its front surface to the collimating optics 113b, and a second polarization of light from its back surface to another collimating optics 113c. Light passing through the collimating optics 113b, 113c may be directed into MM fibers 130. The PBS 136 may thus be used to separate the polarization states of an incoming laser beam that may allow for differential detection of the polarization.

As is well established in the art, this type of differential detection scheme may measure the optical power in two orthogonal polarization components of a reflected laser beam. A differential signal can be a sensitive measure of polarization rotation induced by the Kerr effect at the surface of one of the set of MO discs. The distal ends of MM fibers 130 may be coupled to a set of photodiodes (not shown) allowing processing of the signals by a differential amplifier to create a readout signal. The present invention is not meant to be limited to the aforementioned arrangement of optical elements and sources of light, as other techniques for directing the outgoing laser beam and for detecting the reflected laser beam may be practiced without departing from the invention.

As can be appreciated with reference to FIGS. 1A–1C, the various optical components must be tightly aligned so as to be capable of properly transmitting optical light waves to respective components. Therefore, it is desirable to provide ways for maintaining the locations and relationships of respective components during fabrication, assembly and testing of the components. It is to these ends to which the invention is directed.

The increase in the high storage density of storage devices and desirability of a low read/write head mass require head components (e.g. lens or lenses, coils, fiber optics, mirrors, beam splitters, apertures, and the like) to be as small and low mass as possible. Additionally, the absolute and relative positions of the head components must be accurate and precise. For head components having individual dimensions on the order of a few tens to hundreds of microns (for example, lens diameters on the order of 100 microns to 400 microns, and electric coil diameters on the order of 100 microns to 300 microns), the head components may typically be desired to be placed in positioned within about 0.5 microns of the design location. Typically, the mounting block of a head may have surface dimensions in the order of 1,500 microns by 2,000 microns. Thus, precise placement, positioning and adjustment are a must for a successful and predictable assembly. As will now be described, the invention accomplishes this in a useful and elegant way.

Figure 2A:
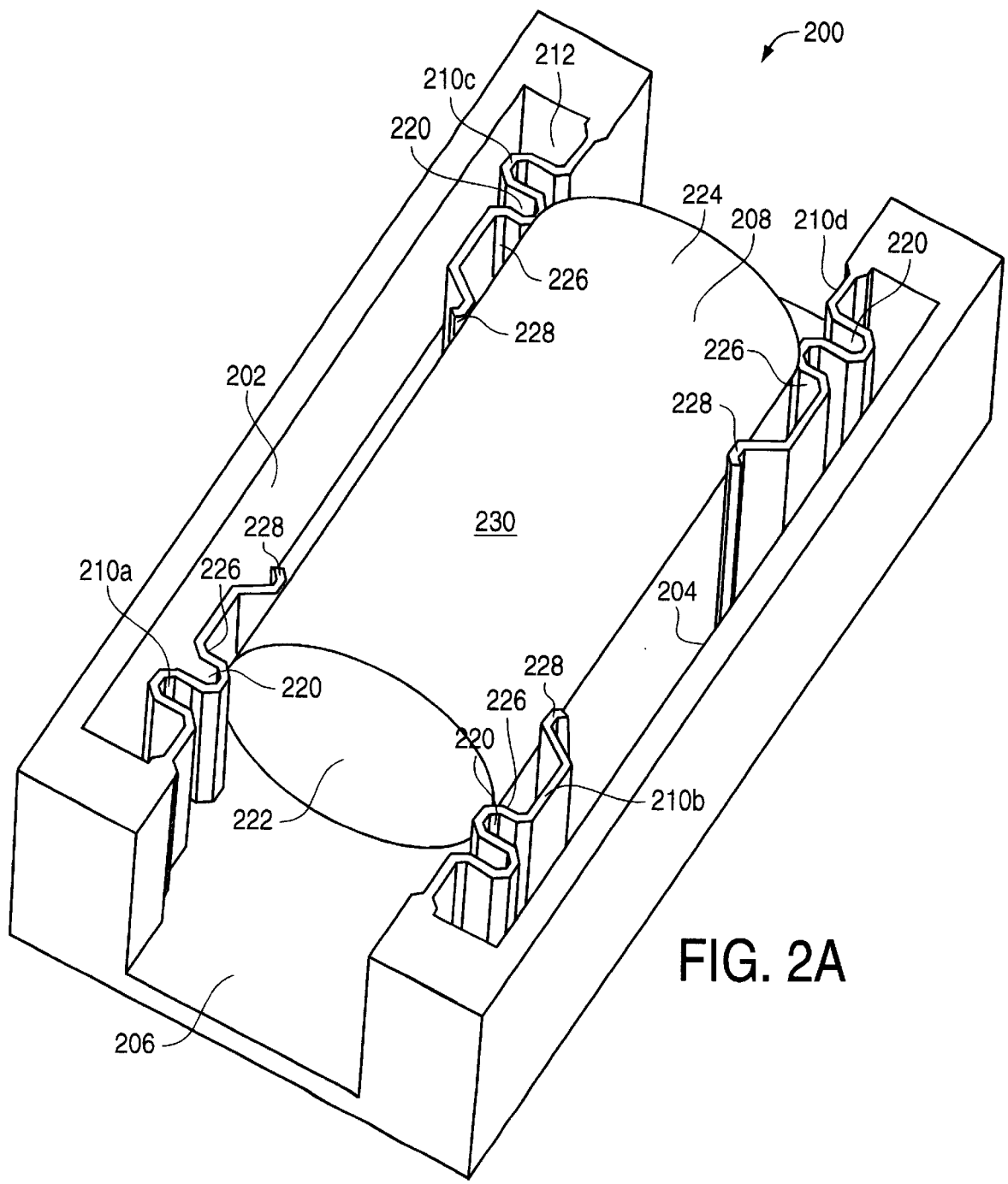
FIG. 2A is a perspective view of a cavity formed within a mounting block and having resilient members engaging a micron-sized object.

Referring now to FIG. 2A, one embodiment of the invention is illustrated as a perspective view of a cavity formed within a mounting block for holding micron-sized objects such as micro-machined optical components. A cavity 200 is defined by two inner walls 202, 204 and a bottom surface 206. The object such as cylindrical lens 208 is held inside the cavity and may or may not be in contact with bottom surface 206. In many applications, including optical circuits, it is important that objects are aligned properly within the cavity. To this end, a plurality of resilient members 210a–210d are included to hold the object 208 in place. The resilient members may be formed as an integral part of the mounting block into which the cavity 200 is borne. The resilient members could also be separate devices attached after the cavity is formed within the mounting block. As is discussed below, it is preferred to have the resilient members formed at the same time as the cavities themselves to optimize the manufacturing process.

Figure 2B:
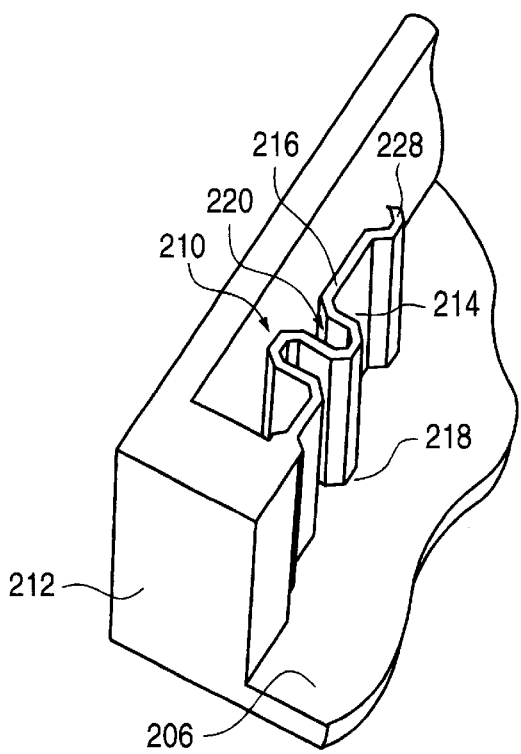
FIG. 2B is a perspective view of a resilient member shown in FIG. 2A.
Figure 2C:
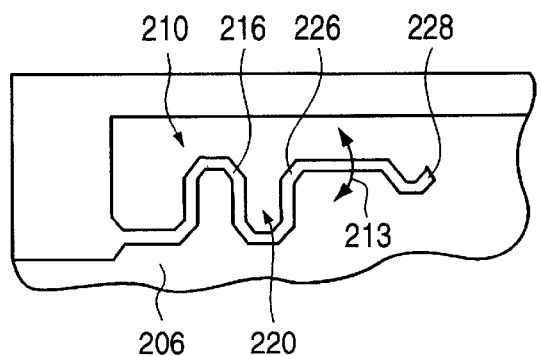
FIG. 2C is a top view of a resilient member shown in FIG. 2A.
Figure 2D:
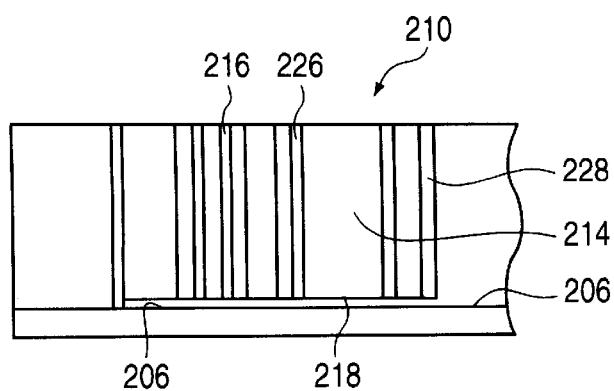
FIG. 2D is a side view of a resilient member shown in FIG. 2A.

Referring now to FIG. 2B, a more detailed view of one of the resilient members 210 is illustrated. FIG. 2B illustrates a perspective view of a resilient member used to engage and hold an object such as object 208 shown in FIG. 2A within a cavity 200. The resilient member 210 is coupled to cavity wall 212 for support. This coupling can be accomplished by micro machining a resilient member 210a–210d and subsequently fastening the resilient member to the cavity wall 212 for support. In another embodiment, the resilient members can be integrally formed within the cavity at the same time that the cavity is formed within the mounting block. One method of such a fabrication process is discussed below. The resilient member 210 is suspended above the bottom surface 206 of the cavity, giving the resilient member the freedom of movement in a spring-like manner. Referring to FIG. 2C, a top view of the resilient member is shown, illustrating the manner of movement of the resilient member 210 suspended above surface 206. In practice, a displacement of approximately 5 microns in direction 213 has been found to be desirable when using the springs to hold and engage object 208. The resilient member 210 may include a vertical surface 214, a top surface 216 and a bottom surface 218. The bottom surface 218 may be parallel with the bottom surface 206 of the cavity as a result of the etching process discussed below. In a preferred embodiment, the bottom surface 218 has little or no contact with bottom cavity surface 206 to allow free movement of the resilient member within the cavity 200. This is further illustrated in FIG. 2D where a side view of resilient member 210 is shown with its bottom surface 218 suspended over cavity bottom surface 206. Resilient member 210 in this configuration is free to move above the surface 206 within the cavity.

Referring again to FIG. 2A, the object 208 is placed within the cavity 200 and is engaged among resilient members 210a–210d to hold the object in place. The resilient members 210a–210d are each biased against the object 208 to hold it in a position predetermined relative to the cavity configuration 200. Each resilient member 210a–210d has a corresponding resilient member between which the object 208 are biased against. In a configuration of FIG. 2A, the cylindrical object 208 is biased between pairs of resilient members 210a and 210b on one end and is further biased between resilient members 210c and 210d at another end. In this configuration, the object 208 can be conveniently placed into cavity 200 and press-fitted into the cavity, forcing the resilient members 210a–210d to be slightly moved to accommodate the object 208 within the cavity 200. Once placed, the object 208 is held in the cavity 200 and is engaged by the two pairs of resilient members at opposite ends. According to the invention, the object 208 can be subsequently removed and repositioned among the resilient members so that it can be adjusted into place.

For example, if object 208 were an optics component such as a collimating lens (see collimating optics 113a–113c of FIG. 1A), the component could be removed and replaced and could also be adjusted and repositioned to align the component to cooperate with other optics components within the optical circuit. The resilient members 210a–210d provide a means for placing and readjusting the object. This is unlike the prior art, where most methods included permanent placement of the object, without the ability to adjust or remove the component after it has been placed into the mounting block.

Still referring to FIG. 2A, in order to further aid the engagement and alignment of object 208 within cavity 200, resilient members 210a–210d may be curved to form alignment projections 220. These resilient members may have undulating surfaces to give them spring-like movement for engaging the objects. They may also include arcuate sections to allow the resilient members to perform like springs. Alignment projections 220 provide surfaces to engage the object 208 on its end surfaces 222, 224 by contacting theses surfaces with first engagement surfaces 226. Theses engagement surfaces are biased against the object 208 at its end surfaces 222, 224 so that resilient pressure is made to the end surfaces when the object 208 is press-fitted into place. Second engagement surfaces 228 are biased against and engage cylindrical surface 230 when the object 208 is press-fitted into place. Utilizing these engagement surfaces of the resilient members 210a–210b, all three surfaces of the cylindrical object 208 can be resiliently biased and held in a well defined position within cavity 200. This technology can also be used to hold and adjustably engage a variety of objects having varying sizes and shapes.

Having extensive engagement with the object 208 can allow for predicable placement of the object within the cavity. In high-volume manufacturing, this can be very valuable, giving predictability to the placement of these small objects. This is especially important in optical circuits where the alignment of the components is important to properly tune the optic circuit for efficient operation.

Figure 3:
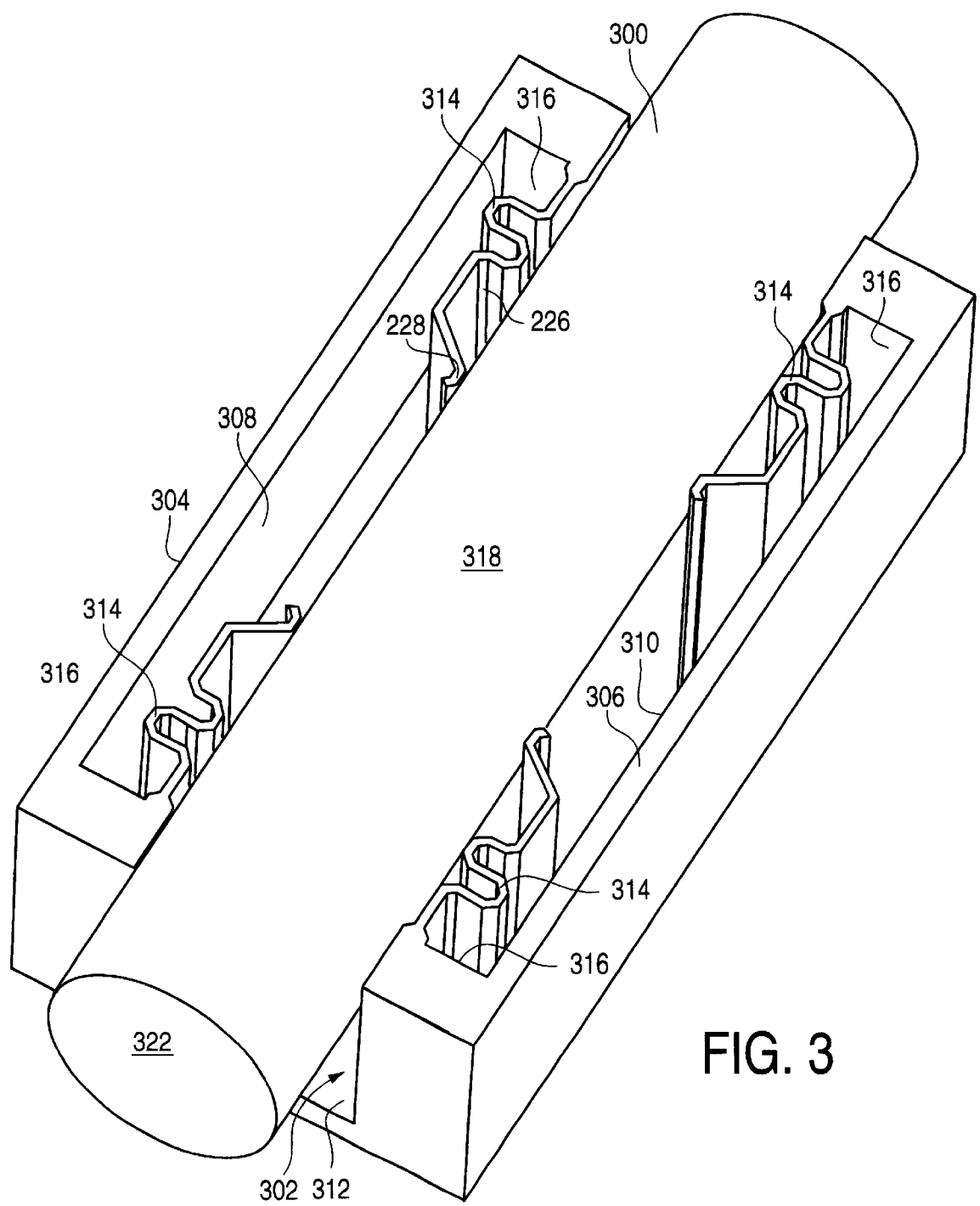
FIG. 3 is a perspective view of a cavity formed within a mounting block and having resilient members engaging a micron-sized object.

Referring to FIG. 3, another configuration is shown where a fiber optic cable 300 is press-fitted into a cavity 302 defined by side walls 304, 306 at the inner surfaces 308, 310 and a bottom surface 312. Resilient members 314 are coupled to the mounting block by surfaces 316. The resilient members 314 are configured to engage the fiber optic cable 300 in its outer surface 318 to hold and secure the fiber optic cable within the cavity.

In operation, the fiber optic cable can be snap-fitted into the cavity and engaged by resilient members 314. The cable is then removably held within the cavity and can be removed and replaced. Furthermore, the fiber optic cable 300 can be moved longitudinally along the cavity to allow adjustment relative to the end of the fiber optic cable 322.

This is particularly useful in a fiber optic circuit such as that illustrated in FIGS. 1A–1C. When placing and adjusting optical cables within an optical circuit, it is useful to be able to adjust the optic cable longitudinally with respect to a collimating lens (collimating optics 113 of FIG. 1A). When properly adjusted, a column lens can better receive all of the light emanating from the optics cable. According to the invention, a configuration such as that shown in FIG. 3 will allow such adjustment after the cable has been placed within the cavity 312.

Figure 4A:
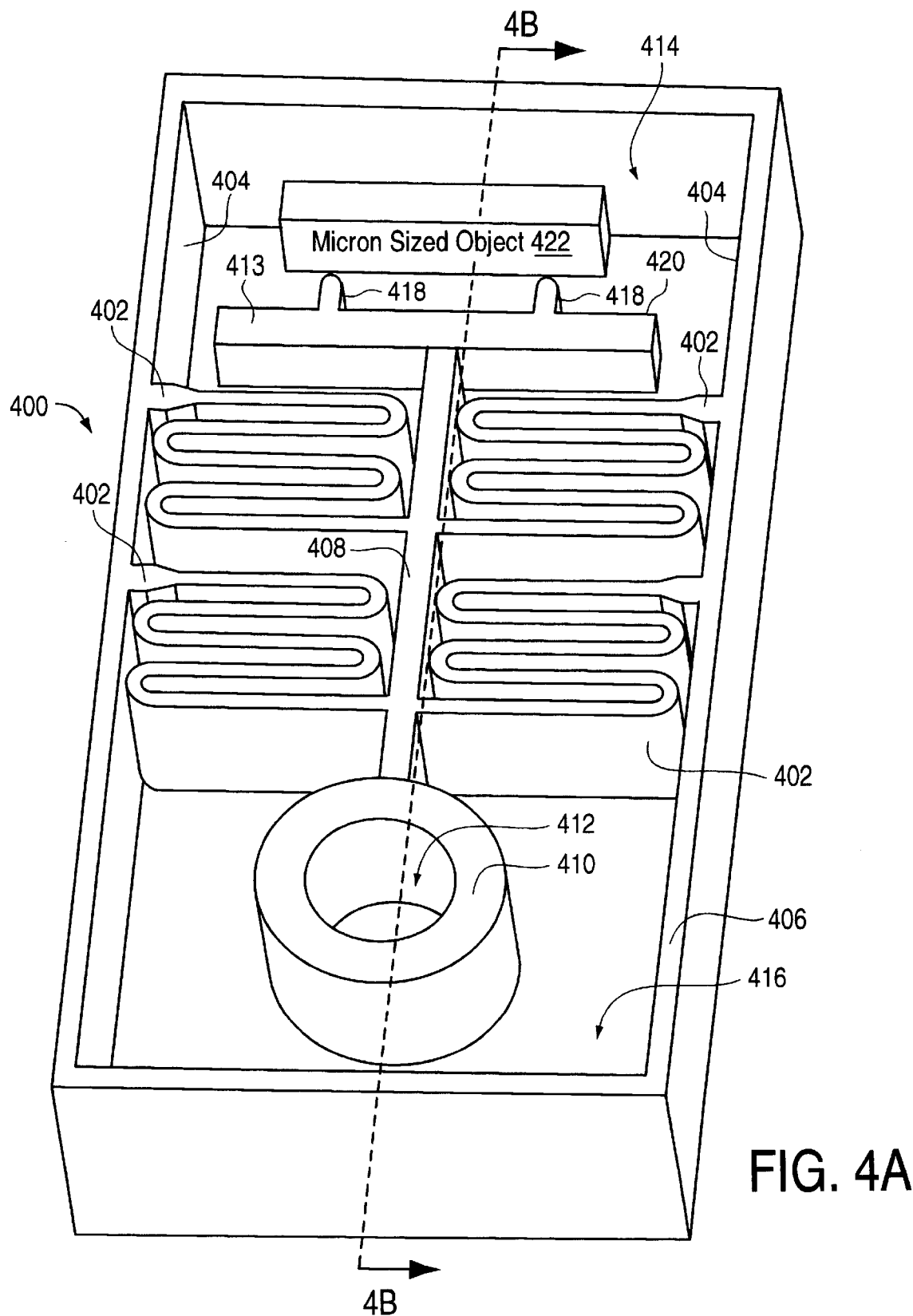
FIG. 4 is a perspective view of a cavity formed within a mounting block and having a resilient member engaging an object according to the invention.

Referring to FIG. 4A, another embodiment of the invention is illustrated. This configuration provides a more convenient way to bias the resilient members to make room for a micron-sized object. One problem with placing components within a cavity using the resilient members is that resilient members often must be separately biased in order to make room for the object. It is preferred that the resilient members be configured to allow simple snap-fitting components within a mounting block. However, in some configurations, these resilient members need to be biased in order to make room for a component before it is placed within a cavity or recess. For example, in the configurations of FIGS. 2 and 3, it would be awkward to bias the resilient members for placing the object within the cavity. In operation, usually a technician has one free hand to bias the springs and another hand to hold and place the object within the cavity. If the configuration allows for easy snap-fitting, then one-handed manipulation is possible. However, if the springs need to be separately biased, it may be difficult. It is to this problem that the configuration of FIG. 4A is directed.

FIG. 4A illustrates a plunger-type resilient assembly for engaging and holding an object within a cavity. The plunger assembly 400 includes a plurality of resilient members 402 that are individually coupled to inside cavity wall 404 of a mounting block 406. Each resilient member is connected at another end to a plunger arm 408. The plunger arm 408 is connected at one end to biasing handle 410 having an inner surface 412 defining an aperture. At the other end of biasing arm 408 is an object biasing arm 413 for engaging a component to bias against a surface of object 422. When holding a component, the biasing arm 413 is biased against at least one surface of the object. Inner wall 414 is biased against an opposite surface of the object to hold it in place between the biasing arm 413 and the surface 414.

Like the resilient members discussed above, the entire plunger assembly 400 is not connected to bottom surface 416. Thus, the assembly can freely move within the cavity while being connected to inner wall 404. The material that makes the assembly is preferably a resilient material that allows the assembly to be biased in one direction, returning to its original position when the bias is removed.

In operation, using a tool that fits within the inner surface 412, a technician can bias the entire assembly 400 in one direction, freeing up the cavity to make room for an object. An object can then be placed within the cavity, unencumbered by the biasing arm 413. The assembly 400 can then be released by removing the force supplied to the handle, releasing the assembly. Biasing arm 413 would then engage a surface of the object against the back surface 414. The object would then be removably engaged within the cavity. If one wishes to reposition or adjust the component, the assembly can be again biased, removing the bias applied by the biasing arm 413 against the object, freeing the object to be removed or adjusted.

The assembly 400 can also include one or more contact members 418 that are configured to contact an object using specially designed contact points or surfaces. Without these biasing contacts, the biasing arm 413 would contact an object using a flat surface. An object could have a similar flat surface onto which the surface 420 would be biased against. In reality, the two surfaces would not be perfectly flat and are indeed unpredictable. In a worse case scenario, the biasing arm 413 could contact the object at a single point. As a result, the object may be unstable, allowing it to be misaligned. Having a finite number of contact points or surfaces defined by members 418 allows the biasing member 413 to secure the component in a stable manner.

Referring to FIG. 4B, a side cutaway view of the plunger assembly 400 is illustrated. The plunger assembly 400 is shown biased against the component 419 on one side. The component is biased on an opposite end by inner surface 414. Engagement members 418 are shown making contact with a surface 422, giving predictable and stable engagement with component 419.

In general, the invention allows for the placement, automatic alignment and adjustment of components within cavities formed in the mounting block. The resilient members are dimensioned and biased so as to engage the components and hold them at least temporarily so that they can be properly aligned and adjusted. These members which can be etched into the silicon at the same time of forming the cavities. The resilient members can also be configured to allow easy snap-fit engagement into a cavity and into a positive alignment. Like the configuration discussed above in connection with FIG. 2, an object can be placed into a cavity and automatically aligned into a predetermined position as a result of the configuration of the resilient members.

Figure 5:
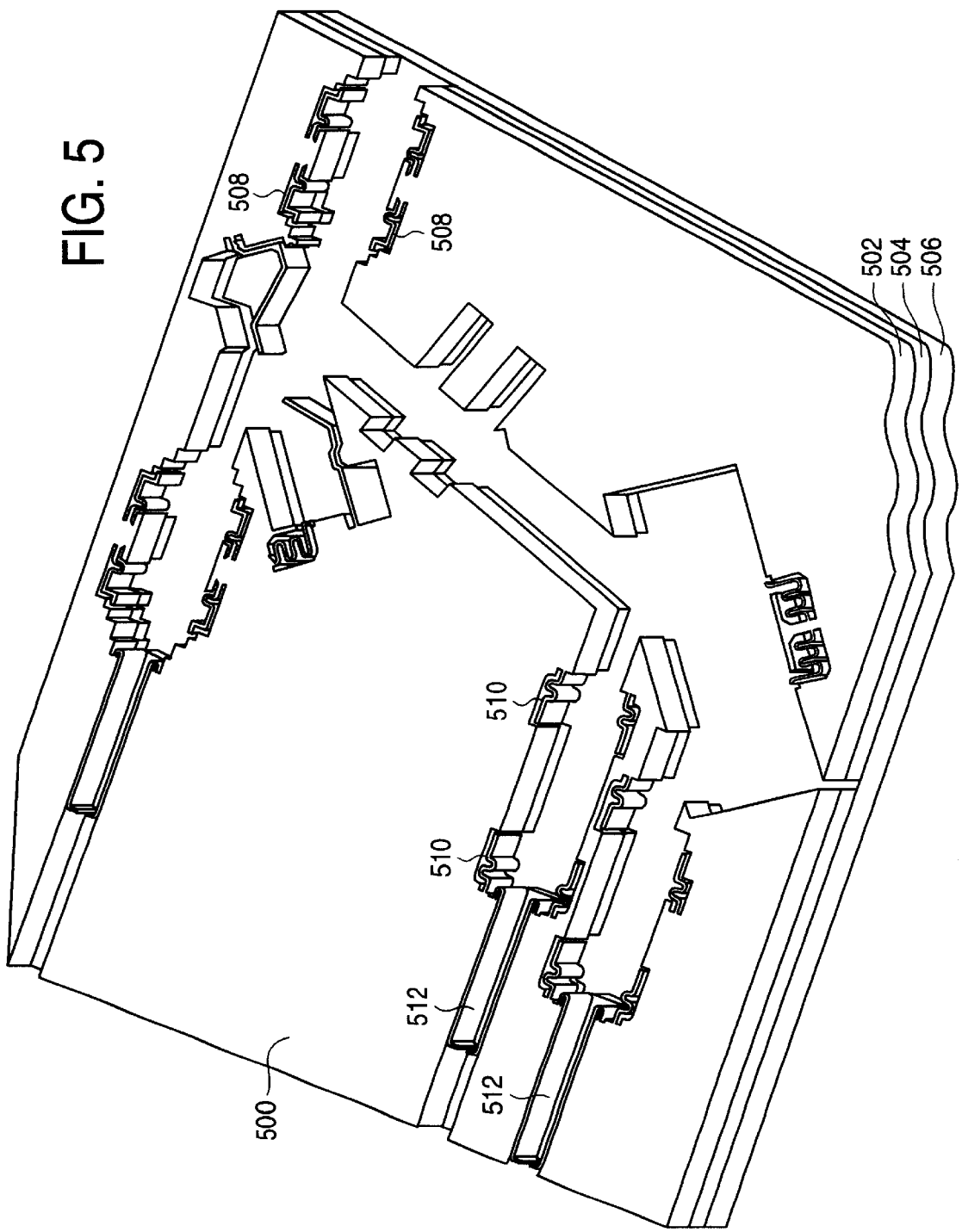
FIG. 5 is a perspective view of a mounting block according to the invention.

One very valuable feature of the resilient members is that they can be formed at the same time the cavities and recesses are formed into the mounting block. This saves a lot of trouble in the manufacturing process in mounting and bonding the resilient members to the mounting block. Referring to FIG. 5, a perspective view of a mounting block having cavities, recesses and resilient members etched into the structure is shown. The mounting block 500 is made up of three layers, top layer 502, middle layer 504 and bottom layer 506. The springs are formed in the top layer 502. The middle layer 504 is formed so as to leave the springs suspended above the bottom layer 506 so that the springs can be biased freely. The springs 508, for example, may be configured to hold a collimating lens (collimating lens 116, FIG. 1A) in an optical circuit. Similarly, optical collimating lens 113c could be held by springs 510. As another example, resilient members 512 may be configured to removably hold fiber optic cables (optical fibers 128, 130 of FIG. 1).

As discussed in further detail below, the mounting block is manufactured by attaching different layers of material beginning with a base layer 506. Middle layer 504 is bonded to layer 506. Top layer 502 is bonded onto middle layer 504. These layers are etched to form cavities, recesses and resilient members according to the invention.

Figure 6:
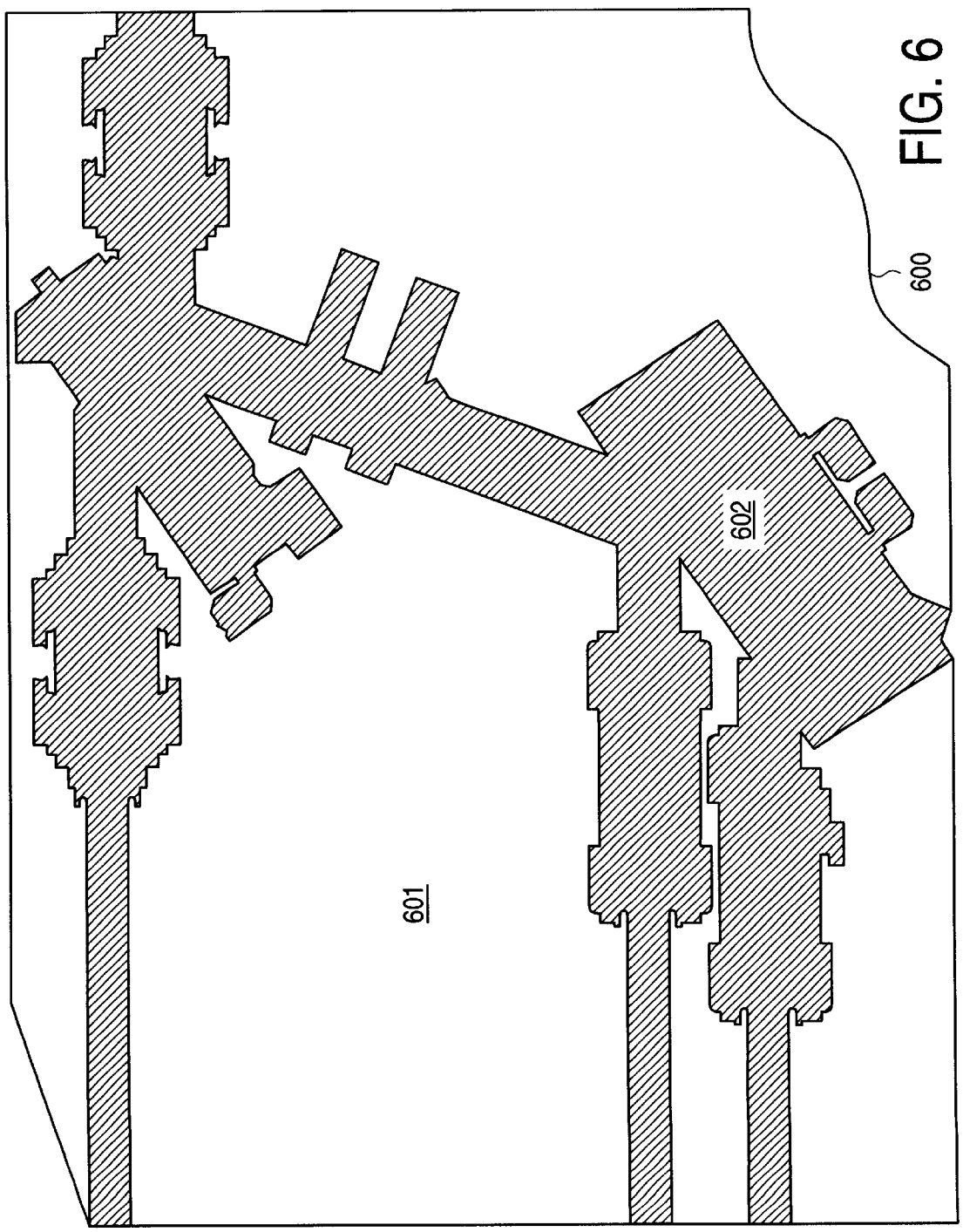
FIG. 6 is a second etching pattern used to create the mounting block of FIG. 5.

Referring to FIG. 6, a mask of material is shown for developing the middle layer 504 to create cavities and recesses configured to hold the optical components. In operation, a second layer 504 is bonded to the bottom layer 506. The two layers are then ground and polished to the desired thickness. The mask 600 is then placed over this second layer 504. The surface is then etched using a deep reactive ion etching (DRIE) process, which forms generally vertical walls while etching the silicon unprotected by the protective layer, known as photoresist, creating the cavities for middle layer 504. The mask consists of a protective photoresist material 601 which covers and protects areas of the middle layer 504 from the DRIE process. The unexposed area 602 is etched down to a predetermined thickness, which could be up to the top surface of the bottom layer 506.

Figure 7:
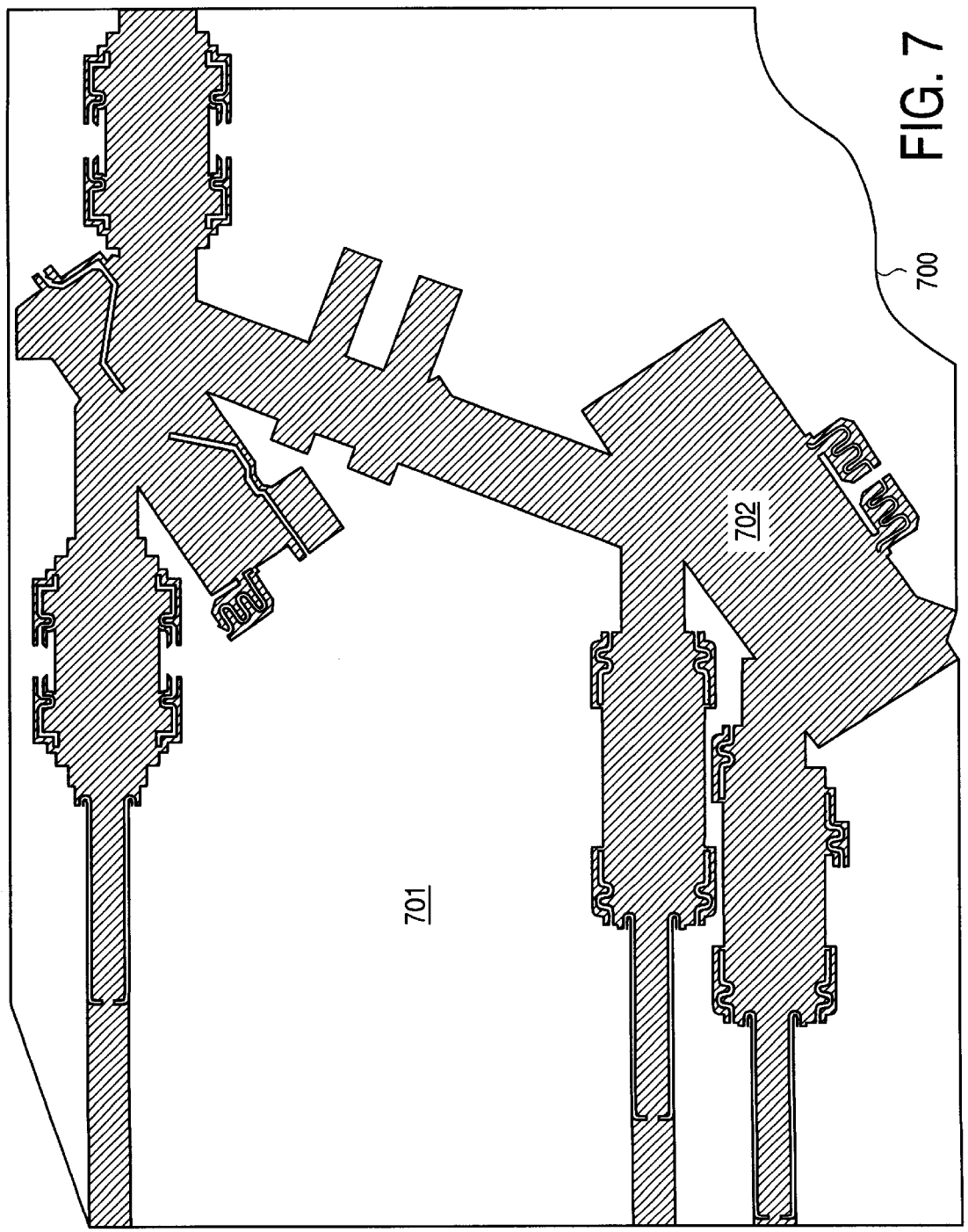
FIG. 7 is a top view of an etching pattern used to create the mounting block of FIG. 5.

Referring to FIG. 7, a second mask pattern 700 having an area of photoresist defining the material that will be protected on top layer 502 and also defining an unprotected 702, which will be etched away in the DRIE process. As can be seen by the mask pattern 700, the top layer will be protected so as to expose the areas surrounding the cavities and recesses as well as the resilient members that will be etched into the top layer 502.

Referring now to FIGS. 8A–8E, a process for applying layers 502–506 is illustrated. In the first step illustrated in FIG. 8A, the process begins with a base layer 800. A second layer 802 is bonded onto the top surface of base layer 800. The two layers are then polished to a certain thickness for consistency. In the next step illustrated in FIG. 8B, photoresist material 803 is bonded to the middle layer 802. An etching process is then applied to the surface, removing material from the exposed surfaces. The result is a cavity 804 etched into the surface of layer 802.

Figure 8A:
FIGS. 8A–8E are side cut-away views of silicon layers used to create mounting block to illustrate the etching process.
Figure 8B:
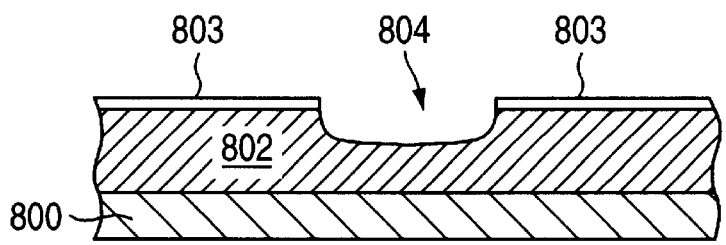
Figure 8C:
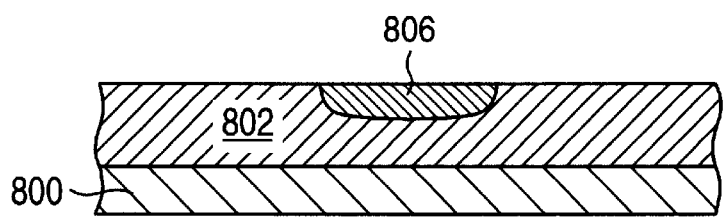

In the next step illustrated in FIG. 8C, the cavity is filled in with sacrificial material 806 in order to level the surface of layer 802 so that a subsequent layer can be added on. The surface is then polished for preparation of the new layer.

Figure 8D:
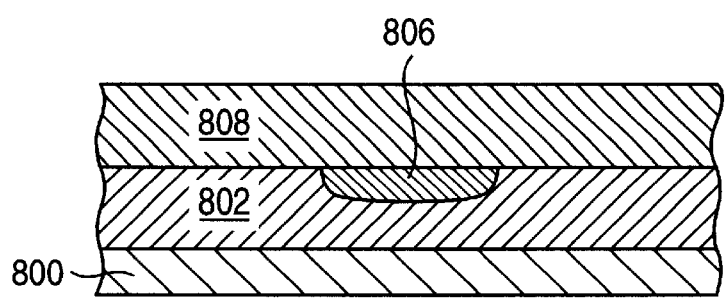

Referring to FIG. 8D, layer 808 is bonded to layer 802, encapsulating the sacrificial material 806 held within the cavity 804. The sacrificial layer 806 can be removed by wet stripping or plasma etching from an exposed region. For example, layer 808 can be etched through and into cavity 804 to remove the sacrificial material 806. The mounting block is now ready for the final step to create the resilient member.

Figure 8E:
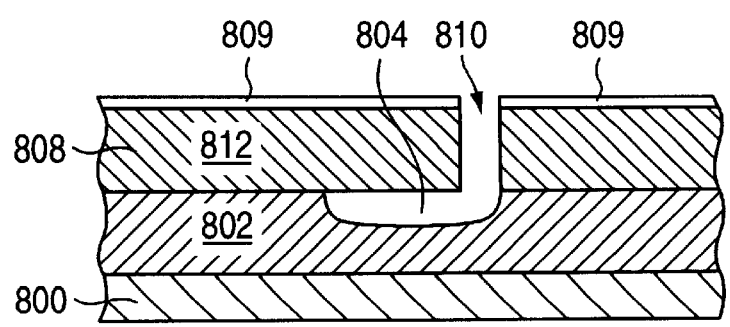

In the final step illustrated in FIG. 8E, a new layer of photoresist 809 is applied to layer 808, leaving exposed areas to be etched. After etching, material is removed from layer 808 and a cavity is created through and into layer 802 to meet with cavity 804. The sacrificial material 806 is removed by the same chemical etching process. The result is a portion 812 that will make a resilient member as discussed above. Referring again to FIG. 5, it is this method that allows the resilient members 508–512 to be suspended over the cavities formed in layer 504 so that the springs can move freely and bias against optical components.

The structures forming the mounting block and resilient members may be made from mono-crystalline (single crystal) silicon using photo-lithographic techniques and Deep Reactive Ion Etching (DRIE). The DRIE technique involves multiple steps to remove layers of a substrate that are exposed through mask patterns laid upon the substrate. First, a protective mask is applied to the surface of the silicon. Then, using gas phase reactants, inert or active ionic species, or a mixture of these, material is removed by chemical processes, physical processes or a mixture of these. When the masks are removed, the material has cavities and recesses in place of the unprotected areas that were exposed to the DRIE process. Other techniques involved in this process include wet stripping and plasma etching. These techniques are well known in the art and other techniques exist.

A silicon wafer that is commonly used in the manufacture of silicon based electronic integrated circuits is conventionally prepared including slicing from the boule, grinding, lapping, and polishing to provide a wafer that may have a 100 mm diameter and a 200 micron thickness. Those workers having ordinary skill in the art will appreciate that the inventive structures are not limited to structures manufactured using this particular technique. Also, the wafers may be larger (for example 200 mm or 300 mm diameter) and have grater or lesser than 200 micron thickness. The wafers may also be made from materials other than silicon.

Referring to FIGS. 9A–9G, further details of one method for creating cavities, recesses and resilient members will now be discussed. Once the polished silicon wafer 900 has been prepared, a patterned photo resist material of conventional composition is applied to a first wafer side 902 in such a manner that regions that are to be protected form etching are covered by the photo resist material 906 and regions that are to have material removed by etching are kept free form photo resist material.

Figure 9A:
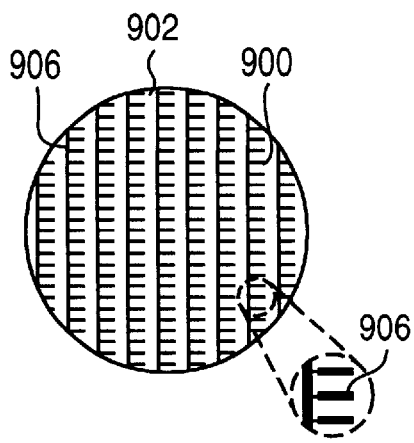
FIGS. 9A–9G are multiple views of a wafer of silicon, illustrating the process ion etching used to create mounting blocks according to the invention.
Figure 9B:
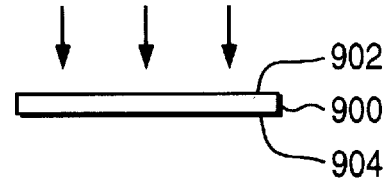
Figure 9C:
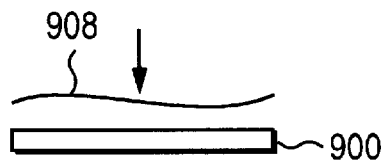
Figure 9D:
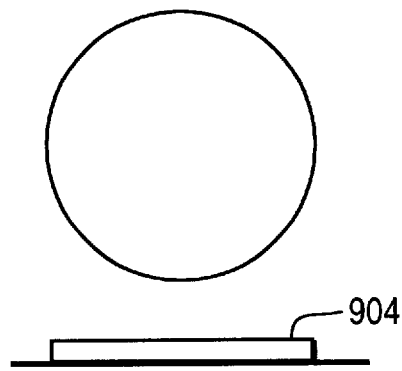
Figure 9E:
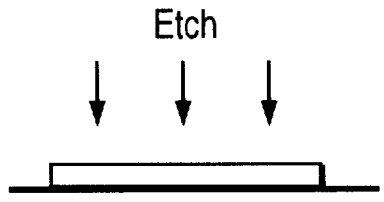
Figure 9F:
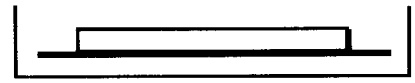
Figure 9G:
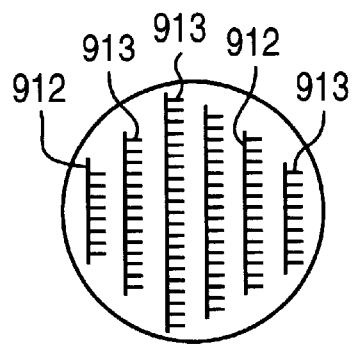

Still referred to FIG. 9A, a structure made according to the inventive method is shown. With respect to the generalized etched structure in FIG. 10, the finished structure 1000 illustrated in FIG. 10 has two sub-parts (1002, 1004) as a result of the through etching from the top and bottom wafer surfaces (902, 904 of FIG. 9). The top or first surface of the wafer has been coated with a material 1006 resistive to the ion etching in regions (1008, 1010, 1012, 1014) and left free of resist material 1006 in region 1016 and the regions surrounding the part. A multitude of mounting blocks may be formed simultaneously from a single wafer. The unprotected region 1016 may generally be formed as islands within a photo resist. The photo resist could also be a continuous region extending between and among the multitude of structures on the wafer to form one or more of the mounting blocks. Similarly, the bottom or second surface of the wafer receives a different patterned photo resist material having protected regions (1018, 1020), and an unprotected region 1022. Those workers having ordinary skill in the art will appreciate that while the finished parts are shown having perfectly vertically etched walls extending between the first and second surfaces, some undermining of material may be expected so that the final structures do not necessarily have material remaining over the entire region to which photo resist material has been applied. These production parameters are taken into account during feature sizing as is common in the art so that the final structures have the desired dimensions. In similar manner, the depth of the recesses is controlled by the ion intensity and etch time to create the desired depth.

Figure 11A:
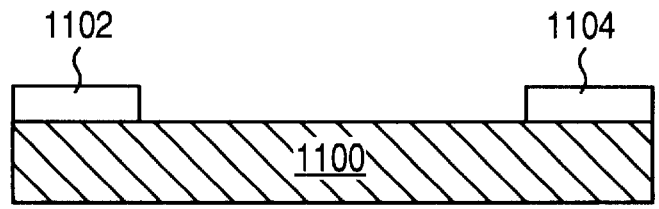
FIGS. 11A–11G are side cut-away views of silicon layers used to create a mounting block to illustrate the etching process.
Figure 11B:
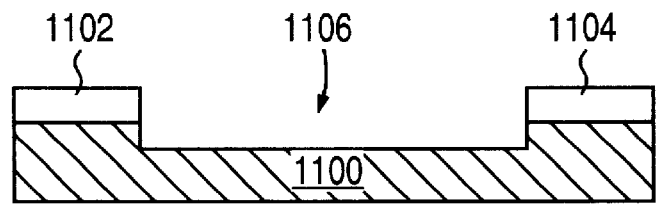
Figure 11C:
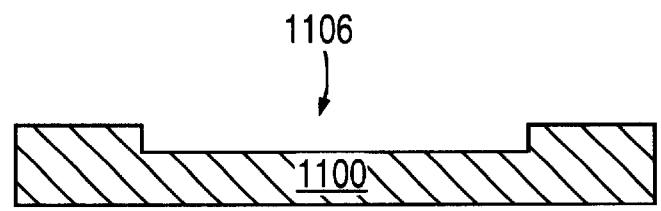

It is also possible to create a mounting block from two layers of materials. Referring to FIGS. 11A through 11G, an alternative process for forming a mounting block having resilient members is illustrated. Beginning with FIG. 11A, a first substrate 1100 is shown having photo resist layers 1102,1104 bonded onto the surface of the substrate to protect certain surfaces. An etching process is subsequently applied to the partially protected substrate to form cavity 1106 within the substrate 1100. This is illustrated in FIG. 11B. The photo resist 1102,1104 is then removed leaving the substrate with cavity 1106, defined by the unprotected surfaces prior to the etching process, as illustrated n FIG. 11C. The cavity 1106 is typically anywhere from 5 microns to 100 microns, depending on the application.

Figure 11D:
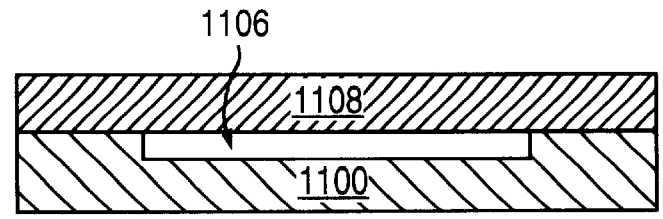

In the next step, illustrated in FIG. 11D, a second substrate is bonded to the first substrate. The second substrate may be ground and polished to a preferred thickness. For example, a wafer may begin as a 400 micron thick substrate that is polished down to a 100 micron thickness. The resulting substrate is then bonded to the surface of the first substrate using fusion bonding or some other type of bonding process. In this example, it is preferred that the second substrate bond only to the surface areas of the first substrate that were protected by the photo resist. This is possible because the unprotected surface areas were etched down to form the cavity 1106, which should be recessed down low enough to avoid contact with the second layer. Once the layer 1108, FIG. 11D, is fused onto the first layer, it encapsulates cavity 1106.

Figure 11E:
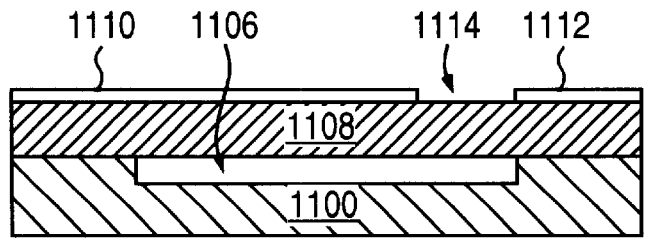
Figure 11F:
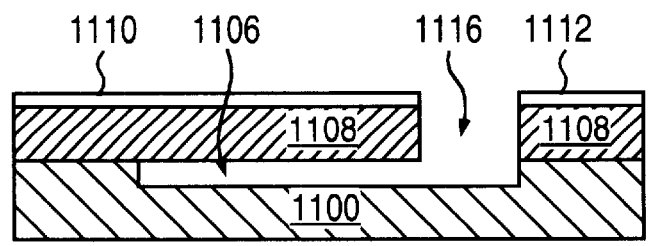
Figure 11G:
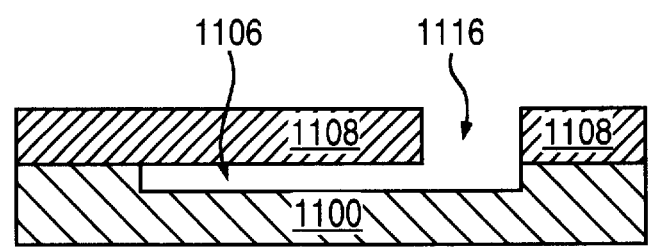

Referring now to FIG. 11E, photo resist 1110,1112 is applied to the second layer 1108 to further define the cavities and recesses as well as the resilient members in the surface of the mounting block 1100. The unprotected surface areas 1114 of the second layer 1108 are left exposed to further machining or etching. The assembly is then etched to open up a cavity 1116 into the second layer and to expose the cavity 1106. The cavities 1106,1116 are thus joined. This is illustrated in FIG. 11F. Once the photo resist coatings 1110,1112 are removed, the two layers 1100,1108 are bonded as one device having cavities 1106,1116 that define the mounting block, as in FIG. 11G. The combination of the cavities can form resilient members as discussed above. The cavity 1106 defined the opening needed in the first layer to free up the bottom surface of a resilient member. This freedom allows it to move freely and be biased with respect to components mounted in the block, also discussed above.

Alternatively, multiple patterning and etching may be carried out on a single side to achieve the desired characteristics. Photolithography, the composition and application photo resistive material to semiconductors, and various types of etching including Deep Reactive Ion Etching (DRIE) are described in standard references (such as for example, *Handbook of Microlithography, Micromachining and Microfabrication*, Volume I and II, by P. Rai-Choundary, editor, published by SPIE Press in 1997, and hereby incorporated by reference) and are well known in the semiconductor processing arts, and not discussed further here.

The invention is directed to an apparatus for holding and engaging micron sized objects on and within a mounting block. The invention includes resilient members formed within cavities and recesses of a mounting block. The invention is particularly adapted to the holding and engaging of micro-machined optics components on and within an optics mounting block, which may be mounted on an optics head that is used for reading, writing and processing optical signals. Although this embodiment is described and illustrated in the context of an optics head having micro-machined optical components mounted thereon and within cavities and recesses formed within the mounting block, the invention extends to other applications where effective handling of particularly small components involved and the holding and engaging of such components is useful. Furthermore, while the foregoing description has been with reference to particular embodiments of the invention, it will be appreciated that these are only illustrative of the invention and that changes may be made to those embodiments without departing from the principles of the invention, the scope of which is defined by the appended claims.

What is claimed is:

1. An apparatus for holding micron sized objects comprising:

a mounting block configured to hold micron sized objects; and a resilient member integrally formed with the mounting block and having a portion for directly contacting a micron sized object so as to be biased against the object and thus secure the object in place.

2. An apparatus according to claim 1 wherein the resilient member includes a curved projection configured to releasably engage a micron-sized object to hold it in place and to allow subsequent adjustment of the micron-sized object being held on the mounting block.

3. An apparatus according to claim 2 wherein the resilient member further includes a curved projection configured to engage a micro-machined object within an opening of the mounting block to hold the object and to allow movement of the object within the opening to provide adjustment of the object within the opening.

4. An apparatus according to claim 1 wherein the resilient member includes a curved projection configured to receive a press-fitted object by engaging the object when the object is forcibly placed within a cavity.

5. An apparatus according to claim 1 wherein the resilient member is configured to bias the micron sized object against a wall of a cavity within the mounting block.

6. An apparatus according to claim 1 further comprising another resilient member configured to bias the micron sized object between at least two resilient members to hold the object in place at least temporarily, allowing subsequent realignment, adjustment and replacement of the object.

7. An optics head for holding a micron sized optical component, comprising:
a mounting block having openings configured to hold the optical component in a manner to form an optics circuit for accommodating an optical signal; and
a resilient member having a portion for engaging the optical component and a base coupled to the mounting block to allow the resilient member to be biased against the component to secure the component, allowing replacement, adjustment, and alignment of the component after it is engaged by the resilient member.

8. An optics head according to claim 7 wherein the resilient member is configured to engage an optical component in a spring-like manner to hold the component in place at least temporarily and to allow subsequent adjustment of the component being held on the mounting block.

9. An optics head according to claim 8 wherein the resilient member includes a spring-like structure configured to engage the optical component within an opening of the mounting block and to hold the component and to allow movement of the component within the opening to provide adjustment of the component within the opening after it is initially placed within the opening.

10. An optics head according to claim 7 wherein the resilient member is configured to receive a press-fitted optical component by engaging the component when the component is forcibly placed within a cavity.

11. An optics head according to claim 7 wherein the resilient member is configured to bias the component against a wall of a cavity within the mounting block.

12. An optics head according to claim 7 further comprising another resilient member configured to bias the component between at least two resilient members to hold the component in place at least temporarily, allowing subsequent realignment, adjustment and replacement of the component.

13. The optical head according to claim 7 further comprising a plunger assembly having a biasing member and plurality of springs coupled to the biasing member, wherein the plunger assembly is configured to linearly bias the biasing member against the optical component.

14. The optical head according to claim 13 wherein the plunger assembly is configured to be moved between a first position and a second position.

15. The optical head according to claim 14 wherein the plunger assembly is configured to receive the optical component when disposed in the first position, the plunger assembly being biased to secure the optical component when the plunger assembly is moved from the first position to the second position.

16. A method of making an apparatus for holding micro sized objects, comprising:
providing a first layer of material for forming a mounting block;
bonding a second layer of material onto the first layer of material;
placing a first pattern of photo resist onto the second layer of material to protect a portion of the surface of the second layer and to define the boundaries of openings to be etched from the second layer;
etching the second layer to remove material from the second layer to form openings within the second layer;
bonding a third layer of material onto the second layer of material;
placing a second pattern of photo resist onto the third layer of material to protect a portion of the surface of the third layer and to define the boundaries of at least one resilient member and corresponding openings to be etched from the third layer; and
etching the third layer to remove material from the third layer to form at least one resilient member and corresponding openings within the third layer; wherein the resilient member is coupled at one end to the mounting block to allow for biasing against an object placed within an opening formed by the second and third layers of material.

17. The method of claim 16 wherein the second layer is etched by over etching the third layer in the presence of a blocking layer.

18. The method of claim 16 wherein the second layer is etched by dry etching in a direction slanted or orthogonal to the direction of the etching of the third layer.

19. A method of making an apparatus for holding micron sized objects, comprising:
providing a first layer of material for forming a mounting block;
placing a first pattern of photo resist onto the first layer of material to protect a portion of the surface and to define the boundaries of predetermined openings to be etched in the surface;
etching the first layer to remove material from the first layer to form openings within the first layer;
attaching a second layer of material onto the first layer of material;
placing a second pattern of photo resist onto the second layer of material to protect a portion of the surface of the second layer and to define the boundaries of at least one resilient member and at least one corresponding opening to be etched from the second layer;
etching the second layer to remove material from the second layer to form at least one resilient member and corresponding openings within the second layer; wherein the resilient member is coupled at one end to the mounting block to allow for biasing against an object placed within an opening formed by the first and second layers of material.

20. The method of claim 16 wherein the first layer is etched by over etching the second layer in the presence of a blocking layer.

21. The method of claim 16 wherein the first layer is etched by dry etching in a direction slanted or orthogonal to the direction of the etching of the second layer.

22. The apparatus of claim 1 wherein the resilient member is a micro-machined resilient member.

23. An apparatus for holding a micron-sized object comprising:
- a mounting block adapted to receive the micron-sized object; and
- a micro-machined member coupled to the mounting block, the micro-machined member having an engagement portion for engaging the micron-sized object and a resilient portion for urging the engagement portion against the micron-sized object so as to secure the micron-sized object in place.

24. The apparatus of claim 23 further comprising an additional micro-machined member coupled to the mounting block, the additional micro-machined member having an engagement portion for engaging the micron-sized object and a resilient portion for urging such engagement portion against the micron-sized object.

25. The apparatus of claim 23 wherein the micro-machined member includes a plurality of resilient portions for urging the engagement portion against the micron-sized object.

26. The apparatus of claim 23 wherein the micro-machined member includes a curved projection.

* * * * *